United States Patent [19]

Ogura

[11] Patent Number: 4,638,235
[45] Date of Patent: Jan. 20, 1987

[54] MOTOR DRIVING APPARATUS

[75] Inventor: Masahiko Ogura, Fujisawa, Japan

[73] Assignee: Kabushiki Kaisha Toshiba, Kawasaki, Japan

[21] Appl. No.: 716,134

[22] Filed: Mar. 26, 1985

[30] Foreign Application Priority Data

Mar. 27, 1984 [JP] Japan ................................. 59-59025

[51] Int. Cl.⁴ ............................................. H02P 8/00
[52] U.S. Cl. .................................... 318/696; 318/685
[58] Field of Search ................ 318/696, 685; 307/350, 307/358

[56] References Cited

U.S. PATENT DOCUMENTS 4,535,294 8/1985 Ericksen et al. ..................... 328/150

Primary Examiner—William M. Shoop, Jr.
Assistant Examiner—Saul M. Bergmann
Attorney, Agent, or Firm—Cushman, Darby & Cushman

[57] ABSTRACT

A stepper motor driving apparatus drives a stepper motor with first and second stator windings inductively connected at one end. A power source section is coupled at one end to a chopper transistor coupled to the node of the windings. The first and second stator windings are connected at the other end to a current sensing resistor through two switching transistors, and also coupled to the inverting terminal of a comparator. Two back-to-back diodes are connected between the other ends of the first and second stator windings. The comparator compares the current detected by the current sensing resistor with a first reference value. As long as the chopper transistor is off, it compares a second reference value slightly less than half the first reference value with the current detected by the current sensing resistor. The chopper transistor is turned on and off in accordance with the result of the comparison performed by the comparator, so that the difference between the detected current and the first or second reference value may be reduced.

2 Claims, 2 Drawing Figures

F I G. 2
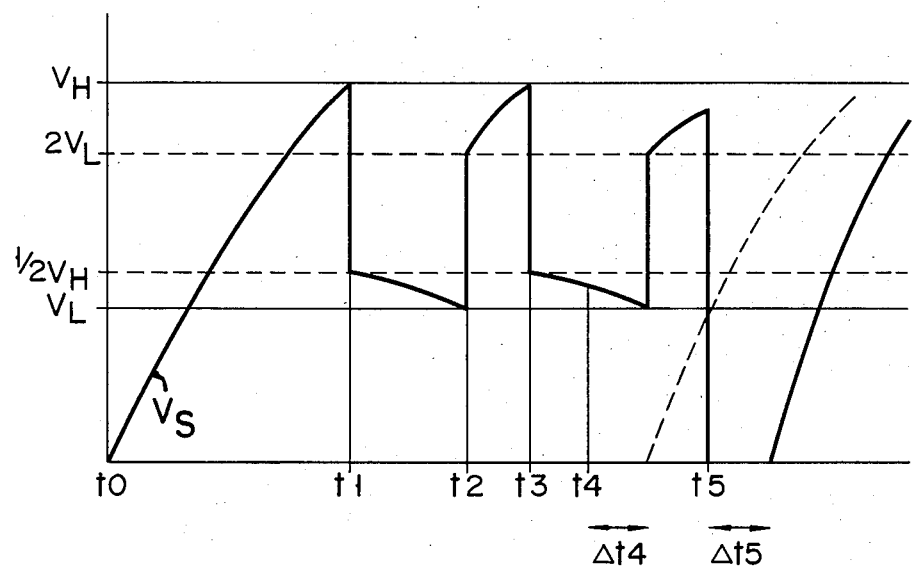

MOTOR DRIVING APPARATUS

BACKGROUND OF THE INVENTION

The present invention relates to a motor driving apparatus for driving a stepper motor under chopper control.

A chopper control circuit for controlling a stepper motor is disclosed in U.S. Pat. No. 4,358,725. The two windings A1 and A2 of a stepper motor are coupled at one end. The node of windings A1 and A2 is connected to a chopper transistor coupled to a power source. The other ends of these windings are connected to two phase transistors. The chopper transistor is turned on and off by chopper control. The phase transistors are turned on and off by phase switching control.

Suppose the chopper transistor is on, the first phase transistor is on and the second phase transistor is off. In this case, an electric current flows from the power source to winding A2 through winding A1, the first phase transistor, and a current sensing transistor. This current gradually increases. When it exceeds the rated current of the stepper motor, it is detected by a current sensing circuit connected to the current sensing resistor. Upon detecting the current, the current sensing circuit supplies a signal to the chopper transistor. This signal turns off the chopper transistor, thus stopping the chopper control. Once the chopper transistor has been turned off, the current flowing through winding A1 is reduced. The magnetic field generated by winding A1 starts decaying. From the decaying magnetic field, a counter electromotive force is generated. Since windings A1 and A2 are magnetically coupled, they induce a voltage from the electromotive force. A current corresponding to this induced voltage flows through both windings A1 and A2 and through a current path constituted by diodes and resistors. This current is half the rated current of the stepper motor. Hence, the power loss at the motor is half the previous value. This current further decreases. When it becomes slightly less than ½ of the rated current, the current sensing circuit and the chopper control circuit turn on the chopper transistor. The chopper transistor is repeatedly turned on and off in this way as long as it is necessary to energize winding A1.

When the chopper transistor and the first phase transistor which is coupled to winding A1 are turned off to stop exciting winding A1 and excite winding A2, a current flows from winding A2 back to the power source through the diode connected in parallel to the chopper transistor.

In the chopper control circuit disclosed in U.S. Pat. No. 4,358,725, the power consumption is reduced by making the current flow through the two windings and back to the power source. However, the circuit has a drawback. Since a reference current is supplied to the current sensing circuit, the resistance of the current sensing circuit increases almost 200% when the chopper transistor is turned off and the current flowing through the windings decreases to a half of the previous value. Consequently, the accuracy of current sensing is lowered.

SUMMARY OF THE INVENTION

Accordingly, the object of the present invention is to provide a stepper motor driving apparatus which not only can reduce power consumption but also can control a stepper motor with a high accuracy.

According to the invention, there is provided a stepper motor driving apparatus for driving a stepper motor with first and second stator windings inductively connected to each other. A power source is provided to supply an excitation current to the first and second stator windings. One end of this power source is connected by a first switching transistor to the node of the first and second stator windings. These windings are connected at the other end to a second switching transistor and a third switching transistor. A diode is connected in parallel to the first switching transistor, in such a manner that it is biased in the reverse direction. A diode is connected between the other end of the first stator winding and the other end of the power source. Similarly, another diode is connected between the other end of the second stator winding and the other end of the power source. A current sensing circuit is coupled between the other end of the power source, on the one hand, and the emitters of the second and third switching transistors, on the other. The node of the second and third switching transistors is connected to a comparator circuit. This comparator circuit compares a first reference value or a second reference value with the output of the current sensing circuit. The second reference value is slightly less than half the first reference value. More specifically, the output of the current sensing circuit is compared with the first reference value when the first switching transistor is on, and is compared with the second reference value when the first switching transistor is off. The output of the comparator circuit controls the first switching transistor.

BRIEF DESCRIPTION OF THE DRAWINGS

FIG. 2 is a timing chart illustrating how the circuit of FIG. 1 operates.

DETAILED DESCRIPTION OF THE PREFERRED EMBODIMENT

Figure 1:
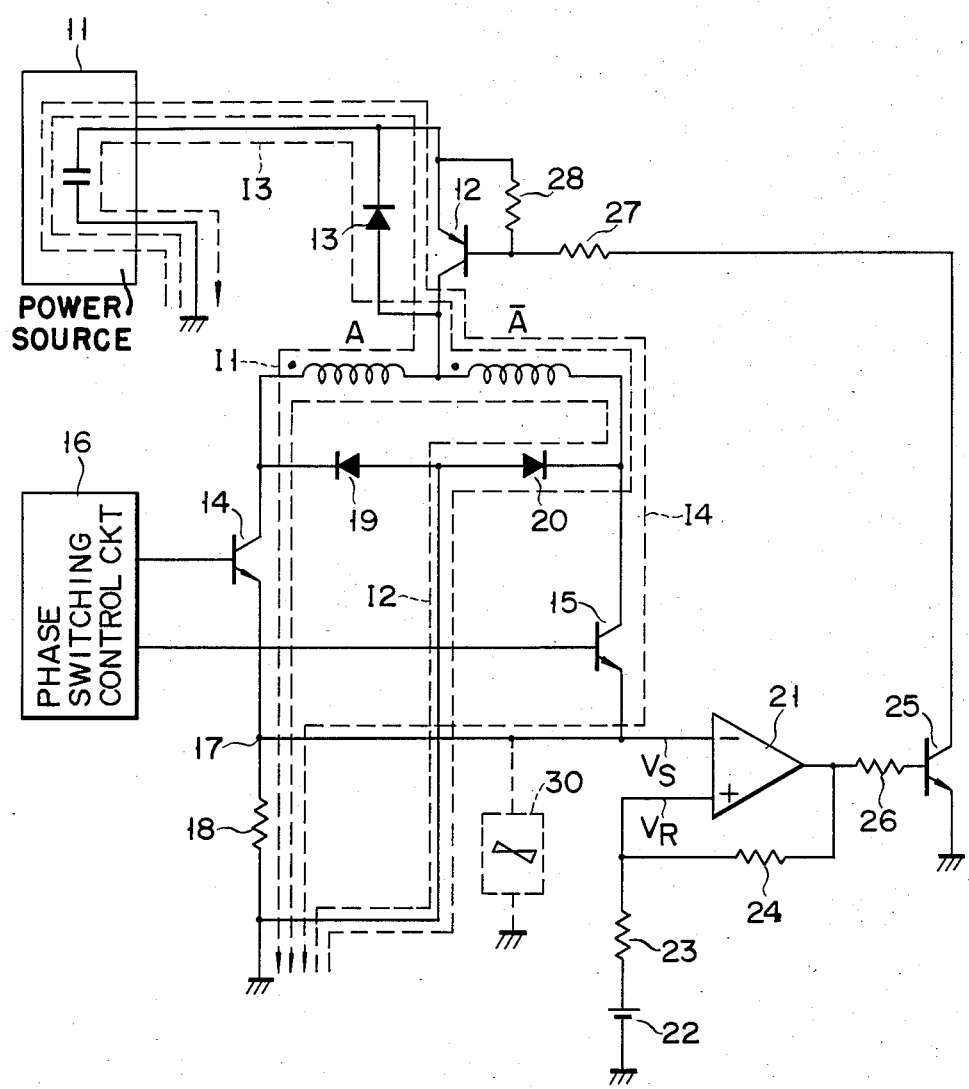
FIG. 1 is a circuit diagram of a stepper motor driving circuit according to the invention.

As shown in FIG. 1, an excitation power source 11 has one end connected to the ground. The other end of power source 11 is coupled to the emitter of a chopper transistor 12. The collector of transistor 12 is coupled to the node of two windings A and $\overline{A}$ mutually connected at one end. A diode 13 is connected in the reverse direction and in parallel to the emitter-collector path of transistor 12. The other ends of windings A and $\overline{A}$ are connected to the collectors of transistors 14 and 15. The bases of transistors 14 and 15 are coupled to a phase switching control circuit 16. The emitters of these transistors are connected to each other, and the node 17 of these emitters is coupled to the ground by a current sensing resistor 23. Windings A and $\overline{A}$ form a serial circuit. Two back-to-back diodes 19 and 20 are coupled to this serial circuit. The node of diodes 19 and 20 is grounded.

Node 17 is connected to the inverting terminal of an operational amplifier 21 used as a comparator. The negative terminal of a reference voltage source 22 is grounded. The positive terminal of voltage source 22 is connected by a resistor 23 to the noninverting terminal of amplifier 21 and also to the output terminal of amplifier 21 by a resistor 24. The output terminal of comparator 21 is coupled to the base of a transistor 25 by a resistor 26. The emitter of transistor 25 is grounded, and the collector thereof is coupled to the base of chopper transistor 12 by a resistor 27. A resistor 28 is connected between the base and emitter of transistor 12.

The operation of the motor driving apparatus shown in FIG. 1 will now be explained with reference to the timing chart of FIG. 2. When the A-phase of the motor is excited, phase switching control circuit 16 outputs a signal, thus turning on transistor 14 and turning off transistor 15. The output level of comparator 21 is high at this time. Transistor 25 is thus on, and chopper transistor 12 is also on. Hence, an excitation current I1 flows from power source 11 to current sensing resistor 18 through chopper transistor 12, winding A and transistor 14. The stepper motor therefore rotates a predetermined angle. Current I1 is detected by resistor 18 as voltage VS. Voltage VS is applied to comparator 21 and is compared by reference voltage VR. Reference voltage VR has a value VH as long as transistor 12 is on, that is, as long as the output of comparator 21 remains at a high level. However, reference voltage VR has a value VL as long as transistor 12 is off, that is, as long as the output of comparator 21 remains at a low level. The resistors 23 and 24 have such resistances that VL is less than ½ VH. The current flowing through transistor 12 gradually increases, and voltage VS proportionally rises during To to T1 When voltage VS surpasses reference voltage VR, (at its high level VH), the output of comparator 21 falls to a low level. As a result, transistor 25 is turned off, as is transistor 12 and reference voltage VR assuming its low level. Although transistor 12 has been turned off, current I2 flows from diode 20 to transistor 14 through windings A and $\overline{A}$. Windings A and $\overline{A}$ have the same number of turns. Therefore, the number of turns possessed by the current path comprised of diode 20, windings A and $\overline{A}$ and transistor 14 is twice that of either winding, and the winding resistance of this current path is twice that of the current path comprised of power source 11, chopper transistor 12, winding A, transistor 14 and resistor 18. Hence, current I2 is half the magnitude of current I1. Voltage VS generated by resistor 18 from current I2 is therefore half (VH/2) the voltage generated by resistor 18 from current I1. This voltage further falls in the period from T1 to T2 when voltage VS falls to voltage VL, the output of comparator 21 rises from a low level to a high level, whereby transistors 25 and 12 are turned on and current I2 flows through resistor 18 so that voltage Vs rises to 2 VL. At the same time reference VR resumes its high level VH. Voltage VS further rises to VH in the successive period from time t2 to t3. Thereafter, voltage VS repeatedly changes in the same manner as during the period from time t1 to time t3.

As mentioned above, current I2 comes to have the value of ½ I1 at time t1 when voltage VS falls to ½ VH. This current flows through both windings A and $\overline{A}$, and the number of turns possessed by the current path comprised of diode 20, windings A and $\overline{A}$ and transistor 14 is twice that of either winding. Therefore, the torque of the stepper motor is maintained. Since current I2 is ½ I1, the power consumed by transistor 14 is reduced by approximately 50%. For the same reason, the power consumed by both windings is also reduced by approximately 50%.

When the supply of the excitation current to winding A of the stepper motor is stopped, transistor 14 is turned off while ransistor 12 is still on (at time t5). Current I1 no longer flows through the path comprised of power source 11, transistor 12, winding A, transistor 14 and resistor 18. Nonetheless, since windings A and / are inductively coupled to each other, a current I3, which is nearly equal to I1 flows through the path comprised of diode 20, winding $\overline{A}$, diode 13 and power source 11 for a period Δt5.

On the other hand, when transistor 14 is turned off at time t4, while transistor 12 is off, current I2 stops flowing. Hence, current I3 flows through the path comprised of diode 20, winding /, diode 13 and power source 11 for a period Δt4. The number of turns of this current path is half that of the path through which current I2 flowed. It follows that current I3 is twice current I2.

Whether current I3 flows for period Δt4 or Δt5, winding / of the motor is excited after the excitation of winding A has been stopped. In this case, after current I3 has become zero, a current I4 flows through the path comprised of power source 11, transistor 12, winding /, transistor 15 and resistor 18.

In the case of the excitation of winding A, the shorter periods Δt5 and Δt4, the greater excitation current flows through the / -phase winding. In the apparatus of FIG. 1, power source 11 applies voltage to winding / while current I3 is flowing, said voltage being applied in the opposite direction with respect to current I3. Current I3 is therefore reduced quickly.

As described above, as long as the chopper transistor is off, the current flowing through the current sensing resistor is compared with the reference value equal to half the value of the current which flow through the current sensing resistor when the chopper transistor is on, and the chopper transistor is turned on or not in accordance with the result of this comparison. This enhances the accuracy of the chopper control of the stepper motor.

What is claimed is:

1. An apparatus for driving a stepper motor with first and second stator windings inductively connected to each other, said apparatus comprising:

a power source section for supplying an excitation current to the first and second stator windings;

first switching means connected between one end of said power source section and the node of the first and second stator windings;

second switching means connected at one end to the other end of the first stator winding and at the other end to the other end of said power source section;

third switching means connected at one end to the other end of the second stator winding and at the other end to the other end of said power source section;

first and second diodes so arranged as to be biased in the opposite directions by said power source section, said first diode being connected between one end of the first stator winding and the other end of said power source section, and said second diode being connected between the other end of the second stator winding and the other end of said power source;

current detecting means for detecting a current flowing through said first and second stator windings;

reference means for selectively producing a first reference level and a second reference level less than half of the first reference value according to a conductivity state of said first switching means;

comparing means connected to said current sensing means and said reference means for comparing the current detected by said current detecting means with one of the first and second reference values output by said reference means; and switching control means for turning on and off said first switching means in accordance with the result of the comparison performed by said comparing means.

2. An apparatus according to claim 1, wherein said comparing means compares said second reference value slightly less than $\frac{1}{2}$ of said first reference value with the current detected by said current detecting means when said first switching means is off, and said switching control means turns on said first switching means when said detected current value is less than the second reference value and at a later time turns off said first switching means when said detected current is greater than the first reference value.

* * * * *